(12) United States Patent
Unnithan et al.

(10) Patent No.: US 11,652,892 B2
(45) Date of Patent: May 16, 2023

(54) AUTOMATIC CONNECTION LOAD BALANCING BETWEEN INSTANCES OF A CLUSTER

(71) Applicant: Oracle International Corporation, Redwood Shores, CA (US)

(72) Inventors: Chandrajith Ramachandran Unnithan, Union City, CA (US); Michael Ullrich Zoll, Foster City, CA (US); Wai Shun Wilson Chan, San Mateo, CA (US); Tak Fung Wang, Redwood City, CA (US); Carol Lyndall Colrain, Redwood Shores, CA (US); Troy Anthony, Redwood Shores, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 16/948,773

(22) Filed: Sep. 30, 2020

(65) Prior Publication Data

US 2021/0099530 A1 Apr. 1, 2021

Related U.S. Application Data

(60) Provisional application No. 62/908,357, filed on Sep. 30, 2019.

(51) Int. Cl.
*H04L 67/148* (2022.01)
*G06F 9/50* (2006.01)

(52) U.S. Cl.
CPC ............ *H04L 67/148* (2013.01); *G06F 9/505* (2013.01); *G06F 9/5088* (2013.01)

(58) Field of Classification Search
CPC ... H04L 67/148; H04L 67/10; H04L 67/1004; H04L 67/145; H04L 67/2833; H04L 67/566; G06F 9/505; G06F 9/5088; G06F 16/27

See application file for complete search history.

(56) References Cited

U.S. PATENT DOCUMENTS

| | | | |
|---|---|---|---|
| 6,523,036 B1 * | 2/2003 | Hickman | G06F 16/27 707/999.01 |
| 2003/0105866 A1 | 6/2003 | Colrain et al. | |
| 2003/0105867 A1 | 6/2003 | Colrain et al. | |
| 2003/0105993 A1 | 6/2003 | Colrain et al. | |
| 2005/0038772 A1 | 2/2005 | Colrain et al. | |
| 2005/0038801 A1 | 2/2005 | Colrain et al. | |
| 2005/0038833 A1 | 2/2005 | Colrain et al. | |
| 2005/0038834 A1 * | 2/2005 | Souder | G06F 9/5027 707/999.201 |
| 2005/0171945 A1 | 8/2005 | Colrain et al. | |

(Continued)

*Primary Examiner* — Patrice L Winder
(74) *Attorney, Agent, or Firm* — Vista IP Law Group, LLP

(57) ABSTRACT

Disclosed is a method, a computer program product, and a computer system for implementing automatic connection load balancing of database connections between instances of a cluster. Load imbalances are detected globally in the cluster, and can be corrected autonomously by the local instances. The local controller/orchestrator detects the imbalance, computes a target for the instance, and makes any necessary adjustments on the instance, where a server marks the connections to redistribute, and then implements draining and/or planned failover to move sessions.

27 Claims, 12 Drawing Sheets

(56) References Cited

U.S. PATENT DOCUMENTS

| | | | |
|---|---|---|---|
| 2005/0256971 A1 | 11/2005 | Colrain et al. | |
| 2005/0262183 A1 | 11/2005 | Colrain et al. | |
| 2006/0015542 A1 | 1/2006 | Pommerenk et al. | |
| 2006/0064400 A1 | 3/2006 | Tsukerman et al. | |
| 2006/0190453 A1 | 8/2006 | Colrain et al. | |
| 2007/0136311 A1* | 6/2007 | Kasten | H04L 67/28 |
| 2007/0255757 A1 | 11/2007 | Tsukerman et al. | |
| 2009/0034537 A1 | 2/2009 | Colrain et al. | |
| 2010/0333094 A1* | 12/2010 | Restall | G06F 9/5027 718/102 |
| 2011/0055368 A1 | 3/2011 | Colrain et al. | |
| 2011/0179105 A1* | 7/2011 | Lindsay | G06F 9/5061 709/203 |
| 2011/0179173 A1 | 7/2011 | Colrain et al. | |
| 2011/0238655 A1 | 9/2011 | Colrain et al. | |
| 2011/0276579 A1 | 11/2011 | Colrain et al. | |
| 2011/0282832 A1* | 11/2011 | Rishel | G06F 9/5083 718/105 |
| 2013/0066837 A1 | 3/2013 | Colrain et al. | |
| 2013/0066948 A1 | 3/2013 | Colrain et al. | |
| 2013/0066949 A1 | 3/2013 | Colrain et al. | |
| 2013/0066952 A1 | 3/2013 | Colrain et al. | |
| 2013/0066955 A1 | 3/2013 | Neel et al. | |
| 2013/0246368 A1 | 9/2013 | Parkinson et al. | |
| 2013/0297566 A1 | 11/2013 | Colrain et al. | |
| 2014/0229531 A1 | 8/2014 | Neel et al. | |
| 2015/0172390 A1 | 6/2015 | Colrain et al. | |
| 2015/0326673 A1 | 11/2015 | Neel et al. | |
| 2016/0019084 A1* | 1/2016 | Forestiero | G06F 9/5088 718/1 |
| 2016/0117357 A1 | 4/2016 | Colrain et al. | |
| 2016/0294723 A1 | 10/2016 | Parkinson et al. | |
| 2016/0294726 A1 | 10/2016 | Parkinson et al. | |
| 2016/0321304 A9 | 11/2016 | Colrain et al. | |
| 2017/0011028 A1* | 1/2017 | Wang | G06F 9/5088 |
| 2017/0220621 A1 | 8/2017 | Colrain et al. | |
| 2018/0129688 A1 | 5/2018 | Colrain et al. | |
| 2018/0157729 A1* | 6/2018 | Lee | G06F 9/505 |
| 2018/0239651 A1* | 8/2018 | Gong | G06F 11/3423 |
| 2019/0073387 A1 | 3/2019 | Silberkasten et al. | |
| 2019/0075170 A1 | 3/2019 | Colrain et al. | |
| 2019/0102267 A1 | 4/2019 | Giloni et al. | |
| 2019/0102401 A1 | 4/2019 | Neel et al. | |
| 2019/0173765 A1* | 6/2019 | Bertran | H04L 41/5025 |
| 2019/0179673 A1* | 6/2019 | Gray | H04L 67/1029 |
| 2020/0250042 A1* | 8/2020 | Sharma | H04L 67/1097 |

* cited by examiner

AUTOMATIC CONNECTION LOAD BALANCING BETWEEN INSTANCES OF A CLUSTER

CROSS-REFERENCE TO RELATED APPLICATIONS

The present application claims the benefit of priority to U.S. Provisional Application No. 62/908,357, filed on Sep. 30, 2019, which is hereby incorporated by reference in its entirety.

BACKGROUND

Data processing systems, such as database management systems (DBMSs) and relational database management systems (RDBMSs), allow applications running on clients (e.g., workstations, personal computers, or remote computing terminals) to access data stored in databases located at one or more database servers. Database servers may be interconnected by a network. This network may also connect one or more clients to the database servers, allowing the clients to submit queries and requests to perform operations on the data stored at the database servers via the network.

A database "cluster" system is a type of system that allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host (or virtual machines on the one host) and forms its own set of background processes and memory buffers, but in which the cluster infrastructure allows access to a single shared database via multiple database instances. In this way, the separate servers (e.g., nodes, or virtual machines) appear as if they are one system to applications and end users.

In clustered systems, performance problems may occur if too many clients all seek to access the same instance or sets of instances to perform their work. This may cause imbalances in the workload in the system such that certain instances have too many connected sessions while others have too few, causing some instances to be over-utilized while others are under-utilized.

One approach to handle this is to use a master-controlled process to control and manage work among the various instances. The master provides load balancing information and instructions to allow selection of work to instances in a manner that is supposed to avoid imbalance situations. However, one problem that may occur is that outages and other unforeseen load situations may occur after selections of work to instances have been made, which means that a previous selection of an instance by a client that may have been previously correct from a load balancing point of view is no longer correct or efficient. In some circumstances, it is not the initial location that matters but rather the choice made by afterwards as to which connection to use; when a run-time load balancer is not able to send/receive, this may create a situation where the system is unable to work out how to optimally resolve suboptimal workload placements. When performance cannot be considered, a pool management component may use various techniques to resolve the issues, using approaches such as round robin, FIFO, and LIFO. However, not all pool components have a runtime load balancer that is capable of implementing these techniques, and even these techniques may not produce optimal results in the absence of more comprehensive performance analysis and planning. This may result in large imbalances and/or skews in the number of connections between instances. Another problem is the situation when the master goes down or becomes unreachable, which would then require some sort of fault-handling and delay to occur in order for the cluster to have another master take over the work of managing load balancing.

Therefore, there is a need for an improved approach for load balancing to which addresses the issues identified above.

SUMMARY

Embodiments of the present invention provide a method, a computer program product, and a computer system for implementing automatic connection load balancing of database connections between instances of a cluster. Load imbalances are detected globally in the cluster, and can be corrected autonomously by the local instances. The local controller/orchestrator detects the imbalance, computes a target for the instance, and makes any necessary adjustments on the instance, where a server marks the connections to redistribute, and then implements draining and/or planned failover to move sessions.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Figure 1:
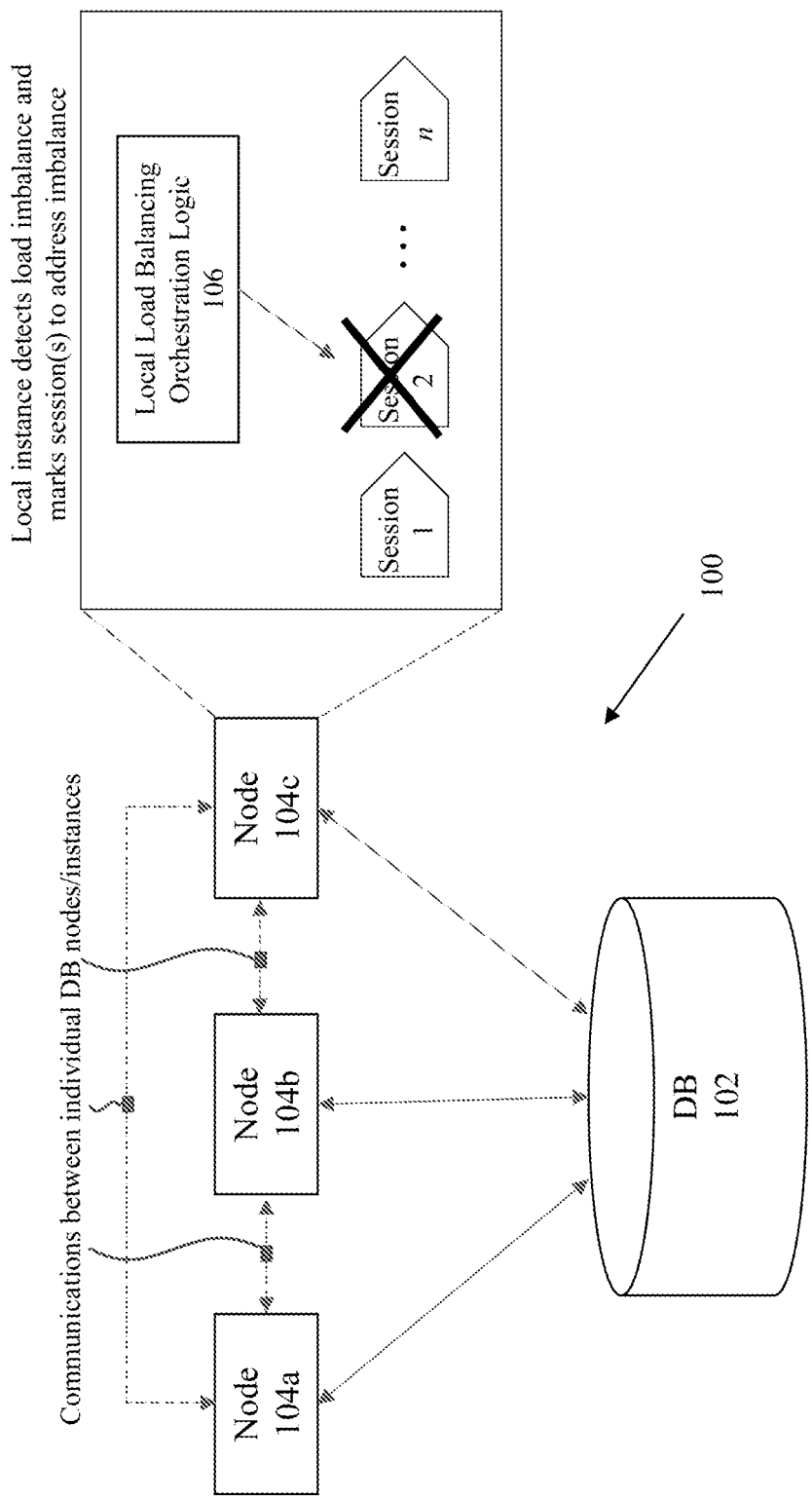
FIG. 1 illustrates a high-level diagram of some embodiments of the invention.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Embodiments of the present invention provide a method, a computer program product, and a computer system for implementing automatic and locally-controlled connection load balancing of database connections between instances of a cluster.

As noted above, one approach to handle load balancing in a cluster is to use a server-controlled or master-controlled process to control and manage work among the various instances. The server/master provides load balancing information and instructions to allow selection of work to instances in a manner that is supposed to avoid imbalance situations. For example, load balancing information that is made available to clients, which allow the clients to select the appropriate instance to avoid imbalance situations. A load balancing advisory may be provided to inform clients of instances that have relatively lighter loads and hence would be appropriate for selection by a client. Runtime Load Balancing (RLB) may be provided in some database products (e.g., in DB products available from Oracle Corporation) to implement this above-described approach for using a master-controlled process to manage load across instances. However, unforeseen service outages may occur after a client selection of an instances has already been made based upon an earlier load balancing advisory. Since the current state of the system has now changed, this means that a significant load imbalance may have occurred in the cluster. A Fast Network Notification (FAN) is a component that may be provided in some database products (e.g., in DB products available from Oracle Corporation), where the FAN provides notifications regarding load imbalances and circumstances that may result in poor system performance. FAN may also be used because a local host or instance may not be able to tell if it is hung or dead. Further details regarding various approaches to implement FAN and/or RLB are disclosed in U.S. Patent Publication Nos. 2005/0256971, 2005/0038801, and 2016/0117357, which are all hereby incorporated by reference in their entirety.

The present embodiments of the invention provide an approach to implement load balancing to correct any such load imbalances that may have occurred in the above-described situations, which are still also able to work with existing frameworks that provide load balancing advisories for selection of work to instances, where a local controller/orchestrator detects the imbalance, computes a target for the instance and makes any necessary adjustments on the instance. This approach is particularly applicable to applications or situations where RLB and FAN are not implemented, e.g., where a client cannot or does not use RLB or is unable to have a FAN provide a hard UP. As such, a server is used to mark the connections to redistribute, and then implements FAN-based draining and/or a planned failover to move sessions.

FIG. 1 illustrates a high-level diagram of some embodiments of the invention, where sessions are chosen to be drained on a server-side locally and globally. This figure shows a database system having a database cluster 100. As previously discussed, a database cluster is configured such that the nodes 104*a-n* in the cluster 100 are communicatively connected to one another such that they appear to function as a collective unit. Although the nodes/servers may be configured as standalone units, each node/server communicate with each other to access a shared/common set of database storage objects in database 102. The clustered database system therefore contains a shared architecture in which multiple running instances can each be used to manage a set of shared physical data files. Each of the database instances resides on a separate host (or virtual machines) and forms its own set of background processes and memory buffers, but in which the cluster infrastructure allows access to a single shared database via multiple database instances. In this way, the separate servers (nodes) appear as if they are one system to applications, clients, and end users.

The clustered database system may have one or more database applications used by one or more users/clients within the system that operate a user station to issue commands to be processed by the database system upon one or more database tables. The user stations and/or the servers that host the database comprises any type of computing device that may be used to implement, operate, or interface with the database. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs. The database system may be communicatively coupled to a storage apparatus (e.g., a storage subsystem or appliance) over a network. The storage apparatus comprises any storage device that may be employed by the database system to hold storage content.

A database application may interact with the clustered database system by submitting commands that cause the database system to perform operations on data stored that is stored in the database. The commands typically conform to a database language supported by the database server. An example of a commonly used database language supported by many database servers is known as the Structured Query Language (SQL). When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command. A database "transaction" corresponds to a unit of activity performed at the database that may include any number of different statements or commands for execution.

With embodiments of the invention, each of the instances on the nodes 104a-n can autonomously implement load balancing for that particular instance 1 without the requirement of having a master load balancing process instruct that instance to handle an imbalance. Instead, each instance includes its own local load balancing orchestration logic 106 to detect and compute the presence of any imbalances, and to locally make a determination whether any actions should be taken at that instance to addresses the imbalance, e.g., by marking a session on that local instance to dis-engage from any further operations on that instance. In concert with this approach, connection pools select free connections to use. By changing the load balance on the server, the pools are guided to new instances.

This approach is advantageous over alternative approaches that require the presence of a master process to coordinate load balancing among the instances. By having the instances locally and autonomously handle load balancing, this makes the current invention more fault tolerant over the single master approach, since the system is no longer reliant upon the correct operation and functionality of the single master. Moreover, since the local instances include a local load balancing orchestration logic, this means that even if changed circumstances have made previous work assignments sub-optimal due to changed conditions or unforeseen outages, the instances are able to self-correct these problems to address any resultant load imbalances. The current approach is therefore able to scale much more effectively as clusters become larger and larger over time.

Figure 2:
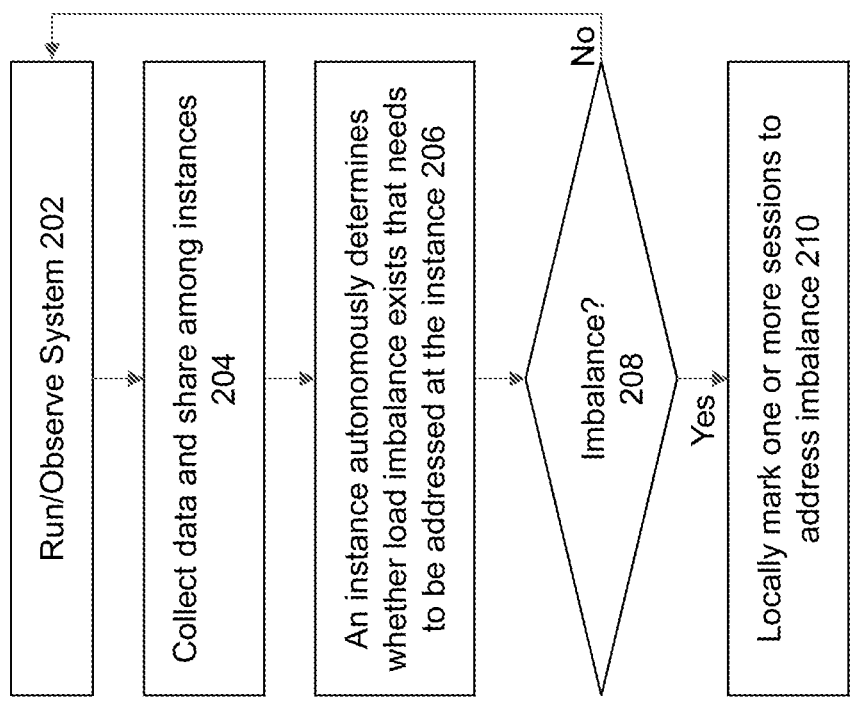
FIG. 2 shows a high-level flowchart of an approach to implement some embodiments for the invention.

FIG. 2 shows a high-level flowchart of an approach to implement some embodiments for the invention. At 202, the system proceeds with running of workloads that are processed by each of the instances in the cluster, and observations are made of the operations of the instances as they handle the respective workloads. As discussed in more detail below, at 204, data is collected that correspond to pertinent metrics within the overall system. The data is shared among the instances, so that each of the instances have enough data to understand a global view of the load distributions.

At 206, an instance will locally and autonomously determine whether a load imbalance exists. The local load balancing logic within each instance can be operated to use the global data to identify whether a skew exists with respect to the operations of that instance. If, at 208, it is determined that an imbalance exists, then the instance will compute a target amount of work (e.g., in terms of connection sessions) that should be removed from that instance.

At step 210, the instance will locally mark one or more of the sessions for removal from the instance. As discussed in more detail below, various options can be taken to remove a session from the instance, including a less invasive approach to "drain" the session, as well as a more invasive approach to force planned failover of the session to another instance. Further details regarding an approach to implement draining and planned failovers is described U.S. Patent Publication No. 2018/0129688, which is hereby incorporated by reference in its entirety.

Figure 3:
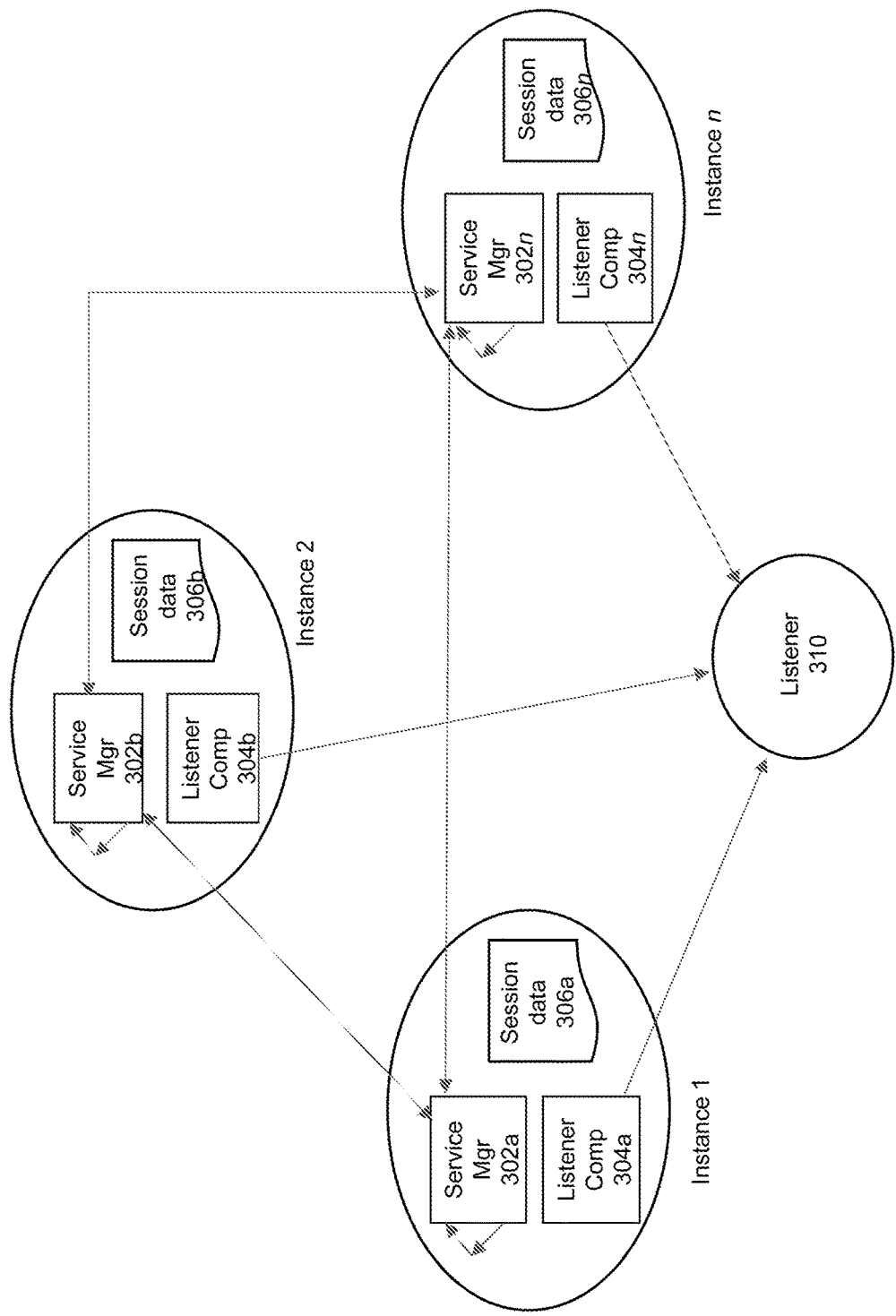
FIG. 3 shows a more detailed figure of an architecture for implementing some embodiments of the invention.

FIG. 3 shows a more detailed figure of an architecture for implementing some embodiments of the invention, where the present embodiment provides an approach to implement load balancing to correct load imbalances which is still also able to work with existing frameworks that provide load balancing advisories for selection of work to instances. Each instance (instances 1-n) includes a local service manager (302a-n) that is the local orchestration component that acts as a localized controller to implement local load balancing operations. The instances include session data (306a-n) for each of the sessions present on that instance. Each instance also includes a local listener component (304a-n) which communicates with main listener 310 (e.g., located at a server), and also communicates with other instances.

The general idea is to extend any already existing service layers for load balancing advisories to collect and aggregate data, and to compute a goal oriented weight to control session counts or utilization per instance and direct traffic accordingly. The current advisories in the service layer are transported to a local listener for connection load balancing (CLB), and to connection pools for load balancing of database requests (e.g., with respect to a RLB). The advisories are produced continually when the service goals are enabled.

With this approach, load imbalances (e.g., in the number of connections) are detected globally in the cluster, and corrected by an actuator in the local instances, controlled by an advisory. The local controller detects the imbalance, computes a target for each instance, and sends the adjustments to the local agents on each instance. The local agents will mark sessions which can be disconnected, where the disconnection will preferably take place at boundaries which do not require recovery or replay. If session state and transactions can be replayed, then the scope can be extended to planned failover (e.g., a smart failover where a session is highly likely to failover), or brute force where an application may see errors. The local agents decide which sessions are eligible and mark them to be disconnected, signaling the client drivers appropriately. The applications will eventually reconnect the sessions to instances which are less loaded via the listener.

In general, the process of certain embodiments comprises gathering metrics for the various sessions that may be connected to instances. A determination is made whether a skew above a certain threshold level has occurred, e.g., whether the number of connections/sessions for the instance is excessive. If so, then a determination is made of the sessions that should be moved from the instance to another instance.

With regard to metrics, the goal of the metric collection and aggregation is to compute a relative ranking (weight) based on load for all the available instances to make optimal placement decisions to relocate sessions/connections and placing for the session/connection. Load may be defined simply as the number of sessions with the goal of an even balance, or co-opt the desirable properties of run-time load balancing that takes into account CPU load and policies for better response time or throughput.

In terms of the features that compute the load function, one or more of the following can be considered in some embodiments, where each service has multiple sessions, and the following features: (a) number of sessions; (b) number of candidate sessions, whether there is a transaction in progress, special cases to avoid; (c) DB's CPU time; (d) colocation tag (e.g., with respect to a rule that should be used to override the cost computation); (e) priority/price; (f) service time; (g) throughput; (h) resources consumed by the work; and/or (i) load. The data from each instance (e.g., instance identifier, service name, number of sessions, number of sessions per CPU, etc.) can be aggregated globally on each instance to compute a global ranking of the instances for each service.

For a given service, the metrics are calculated and checked against a threshold to determine whether the instance is an instance for re-balancing. In the current embodiment, no master is used, where each instance can make a determination on its own. Thereafter, an ordered list of instances to target can be identified.

As shown in FIG. 3, each instance's service manager will collect the above metrics for all active services in that instance. With regards to aggregations, each instance will aggregate the metrics for each service to identify the load distribution among the participating instances. It will detect a skew that can be computed in the target metrics (e.g., number of sessions, CPU, response time, throughput, and load) and adjust the weights for the service on each instance based on the goal. It will also determine when a goal is achieved.

Once the relative ranking of the instances are aggregated for a given service, the rebalancing of the load will take place. Each instance's new target load will be set by the metrics computation, and each instance's service manager will mark the sessions in the session data that is deemed to be reaped to meet the global performance goals. The service manager will periodically check for the targeted safe sessions and notify them at safe points in their execution. The service manager on each instance will run the metrics computation and orchestration logic.

With regards to the interval and threshold at which the system decides to load balance, it should avoid sending data around too frequently until the load imbalance has reached a certain defined threshold. To avoid oscillation, a long moving average should be employed, which serves to avoid relocating the load from one location, and then immediately relocating back. If the load balance threshold is defined, the interval can then be dependent on that criteria. In some embodiments, a sliding decision window of N samples/cycles, e.g. a time series of threshold violations, may be appropriate to avoid false alarms due to oscillations. For the size of the window N, the metrics will be monitored and only if M violations occur, the rebalance action will be triggered by the orchestrator (e.g., by default, N and M can be 1).

The system should keep track of the success, start, and end of a rebalance operation, e.g., the state of a rebalance operation. The imbalance may change when new connections are made as the arriving load changes, and the imbalance may improve or become worse due to changes in arriving load after rebalance was initiated.

Therefore, the system should be able to refresh the current state of the rebalance operation, or cancel one which is currently in progress. It is also possible that a goal cannot be achieved because sessions cannot be gracefully moved and an existing imbalance could remain, hence it is important to have a stopping criterion, or exclude non-drainable sessions from the computation. The stopping criterion could be as simple as a previous threshold violation disappearing, thus indicating success of the operation. Since the aggregation and orchestration are running in a constant feedback loop, these control adjustments can be feasible in each monitoring cycle. The metrics feedback cycle can be continuous, e.g. based on an assumption that the machinery is running constantly. The actuation of the rebalance (e.g., the sending of the weights and a start token back to the instances which need to shed connections), can be delayed for periods in which the cluster is transitioning (e.g. planned maintenance, reconfiguration and recovery, assuming that these periods can be identified).

The listener component on an instance is a listener registration that is a DB side component to propagate load balancing and service status information to a local listener.

In terms of workflow, in some embodiments, each service manager detects the skew, and then computes the number of sessions (delta) to shed for those instances that have more sessions than the global average. It also sets the blackout flag for these donor instances. Afterwards, the donor marks candidate sessions to be disconnected and checks progress on a periodic basis (e.g., every 30 secs). As soon as the target is reached (e.g., less than the global average), then it clears the blackout flag.

The system may balance while the donors are blacked out, or it may skew to the receiver instances if additional load is connected. The adjustments can be sent continuously, but the system would keep track of which instances are blacked out to avoid cascading blackouts.

Figure 4:
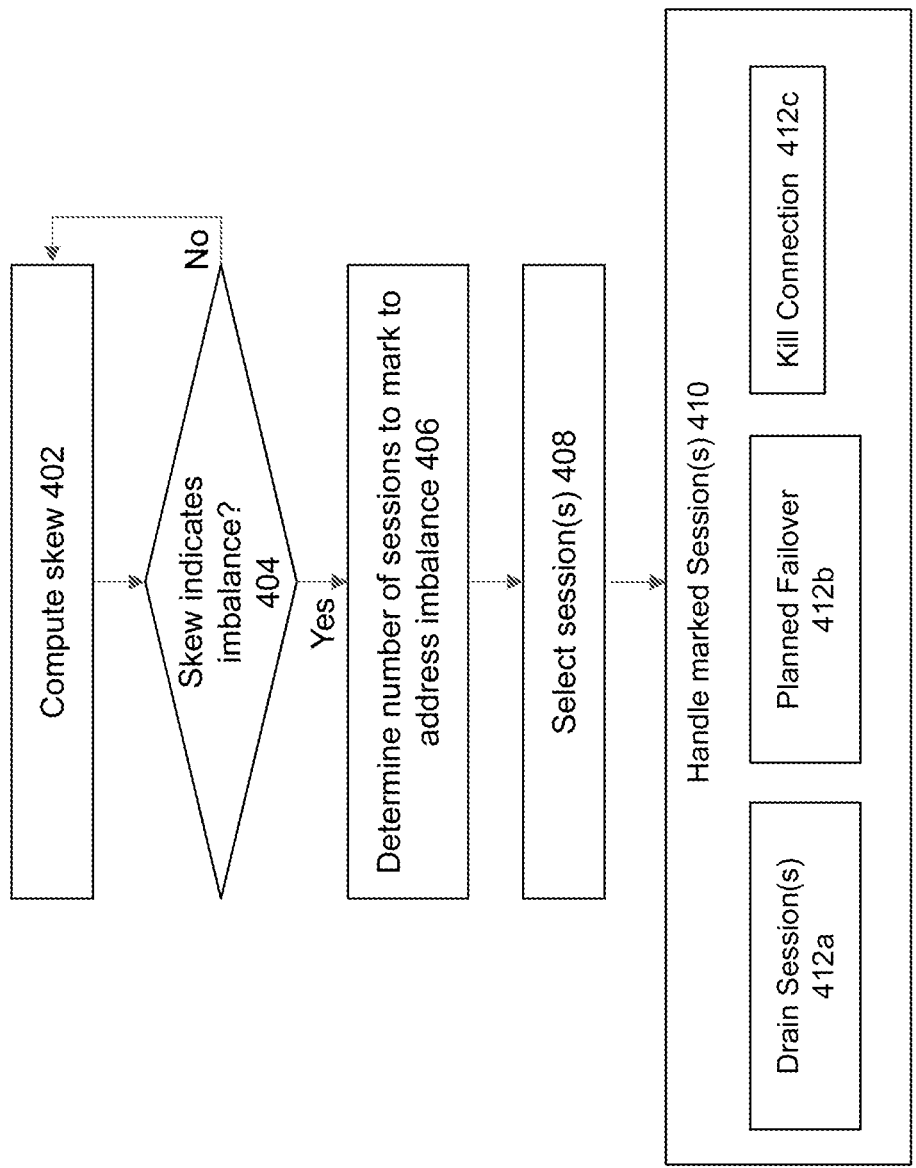
FIG. 4 shows a flowchart of detailed steps to implement some embodiments of the invention FIGS. 5A-F provide an illustrative example of an embodiment of the invention.

FIG. 4 shows a flowchart of detailed steps to implement some embodiments of the invention. At step 402, an instance will perform skew calculations using the distributed global data, and at 404, the skew information is used to determine whether a load imbalance exists in the system. Any suitable approach can be taken to implement the skew calculations and/or determination of load imbalances.

In some embodiments, one or more policies may be established to make these determinations, based upon goals established for the system, e.g., by the system administrator or database administrator (DBA). For example, a given policy may take into account whether the goal is to balance (a) CPU loads, (b) response times, and/or (c) throughput (e.g., based upon SQLs processed per second). A moving average (e.g., a long moving average or a weighted moving average) may be computed for each of these measures to identify if any skew exists for one or more of these measures for an instance.

A threshold may be established for a skew value to determine whether the skew calculations indicates the presence of a load imbalance. For example, a threshold of 5-6% over a global average may be defined as part of a policy, where if the skew exceeds that threshold level, then the system would identify the presence of a load imbalance.

If the skew calculations identify an actionable imbalance, then the processing proceeds to step 406 to identify a target number of sessions that should be identified to be removed from the instance. Any suitable approach can be taken to make this determination. In a very simplistic approach, each session may be considered to consume an equal proportional amount of resources on the instance, and hence the targeted number of sessions would be enough to proportionally reduce the local instance load to a defined load level. For example, if there is a desire to reduce 5% of the load on a given instance, and there are 100 current sessions on the instance, then 5 sessions would be targeted for removal from the instance in this very simplistic approach. An alternative approach would base the session targeting upon the estimated or actual load imposed by each session upon the instance, and thus would be able to more precisely determine the number, identity, and priority of sessions to remove to achieve a given load reduction goal. A learning approach (e.g., using machine learning and modelling) may be used to implement precise identification of sessions to mark to achieve a given performance goal.

At step 408, specific sessions will now be identified on the instance for removal. The specific sessions to be targeted should be based upon criteria so that certain properties of the sessions are recognized and reviewed to identify sessions to be marked that will least result in negative perceptible impacts upon the end users.

For instance, one approach is to only select sessions for removal that are capable of being recovered in the event of a problem. By way of example, consider that some databases allow given sessions to be designated to be enabled for high availability (HA), such that in the event of a problem or failure scenario, the session can be "failed over" to another instance. Thus, for the HA-enabled sessions, various levels of state are tracked for the session so that the session can be shut down at a primary location and brought back up again at a secondary location to continue its processing from the last recorded state for the session with hopefully no loss of data or work product. Therefore, such HA-enabled sessions should be selected over non-HA-enabled sessions to be marked for removal, since these sessions will use planned failover to induce failover at places where failover is most likely to succeed.

At step 410, the identified sessions are addressed for removal. A number of different approaches can be taken to address the marked sessions. The less aggressive approach is configure the response messages to the client so that the client will on its own connect to a different instance, e.g., by performing a "drain" procedure at step 412a, which drains work away from sessions that are targeted for removal from the instance. With the draining procedure, the instance can be configured to provide a "service unavailable" response message to the client when the client sends a service message to the instance, so that the client will know to move to another instance to get its workload handled. The next approach at 412b is to mark and allow planned failover to suicide a session itself where that session is ready to failover. The most aggressive approach, at step 412c, is to simply kill the connection so that the client will be forced to connect to another instance. The last approach is likely to be more invasive than the drain approach and planned failover approach, since the application may see errors when failover cannot occur. For the last, the system may implement a one-time session migration when possible (see also planned failover). Therefore, in one embodiment, the kill approach will not be used until the drain approach and the planned failover approach have been given an opportunity to succeed.

The load balancing advisory information will also be updated as part of the overall process to make sure updated information is provided to the clients. One reason for providing this updated information is to make sure that the listener does not assign a killed session right back to the instance from which it was just removed.

Figure 5A:
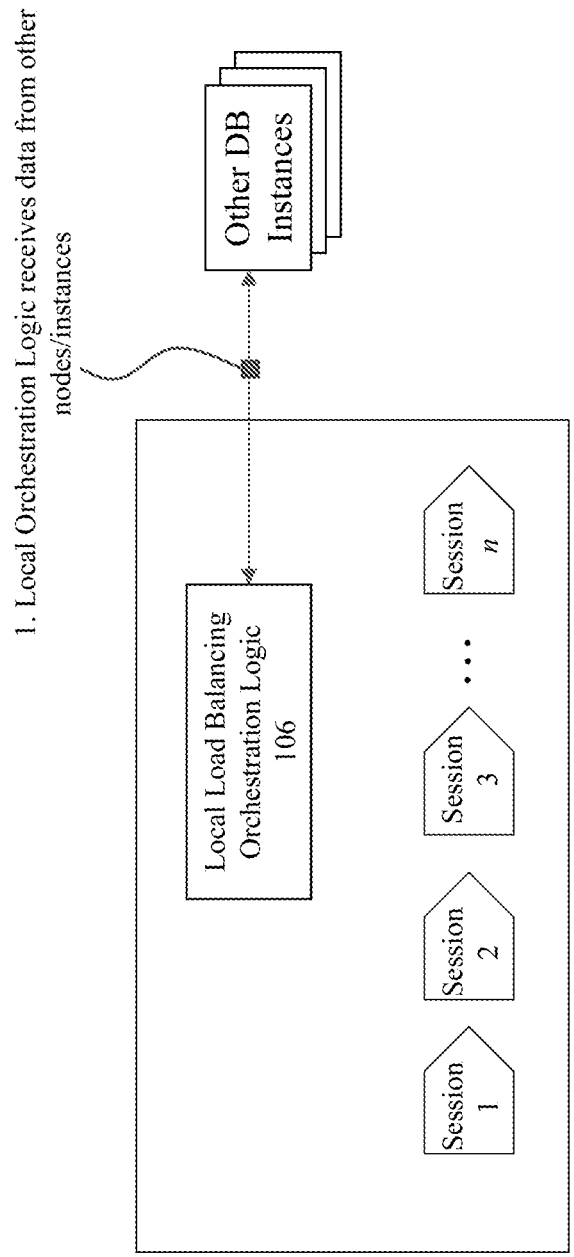
Figure 5B:
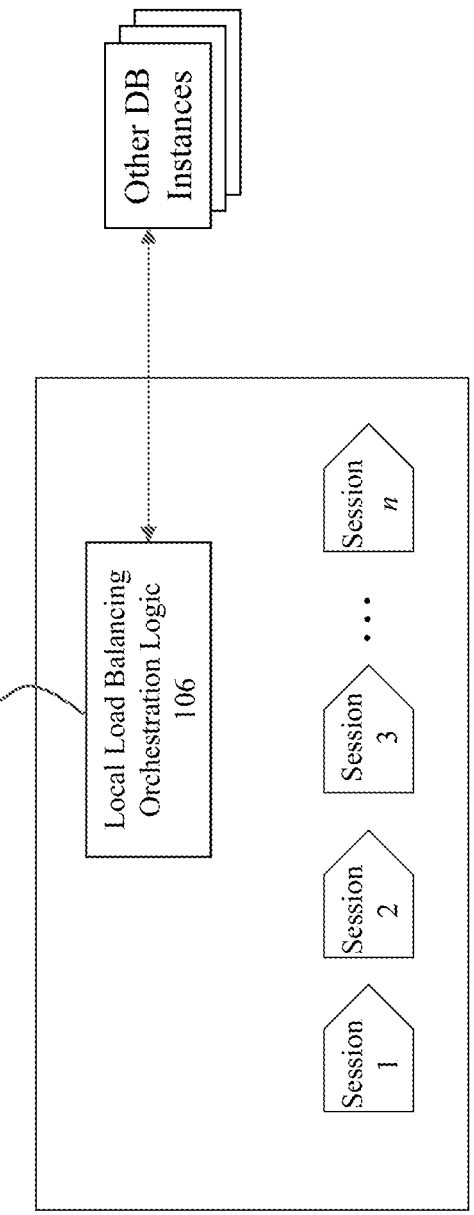

FIGS. 5A-F provide an illustrative example for this process. FIG. 5A shows the situation where an instance is in the midst of processing various workloads using sessions 1-n, and the local load balancing orchestration logic 106 is receiving global data on an ongoing basis that provides the instance the ability to locally understand a global view of loads across all the instances in the cluster. As shown in FIG. 5B, the instance will use that global data to perform local determinations of skew values, and based upon one or more policies, will determine if any load imbalances exist.

Figure 5C:
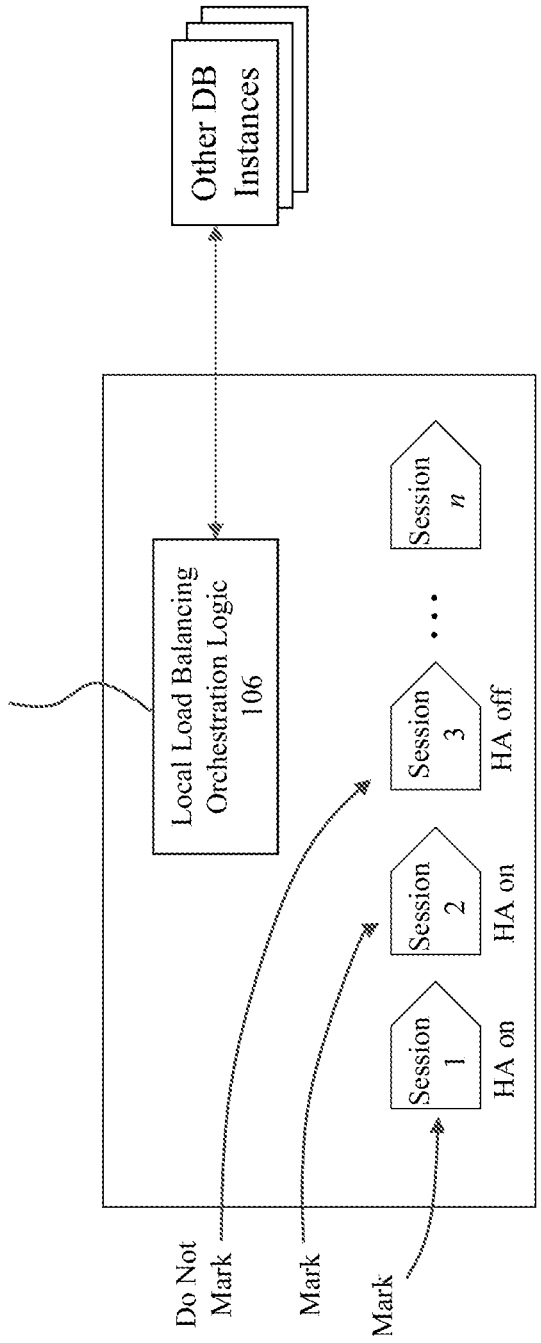

FIG. 5C shows the situation where the instance has made a determination that a load imbalance exists. As such, one or more sessions will be marked to correct the load imbalance. Assume that the instance needs to target two sessions in order to correct the specific amount of skew that was identified for the load imbalance. The properties of each session on the instance are examined to identify the specific sessions to mark. In the current example scenario, it can be seen that session 1 and session 2 are both HA-enabled. In contrast, session 3 is not HA-enabled. In this situation, both session 1 and session 2 are therefore marked, whereas the instance will choose not to mark session 3.

Figure 5D:
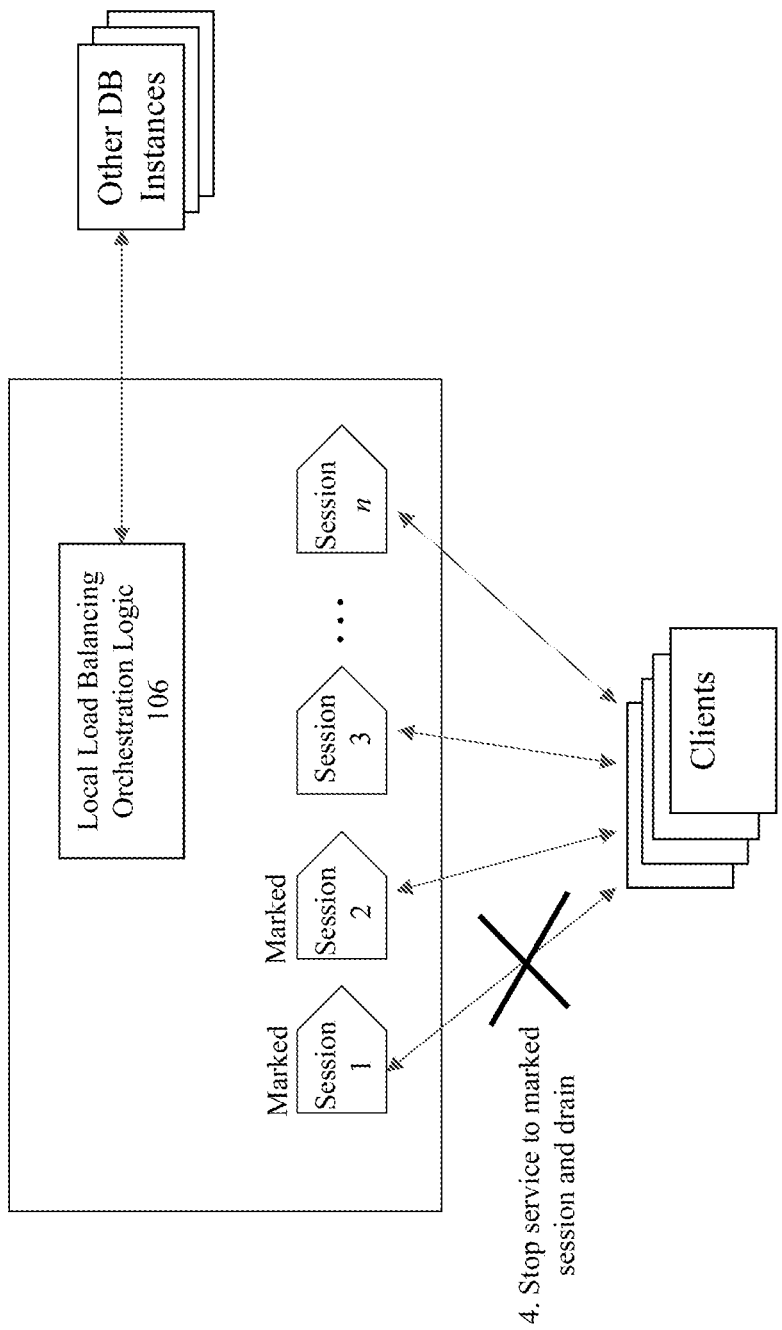
Figure 5E:
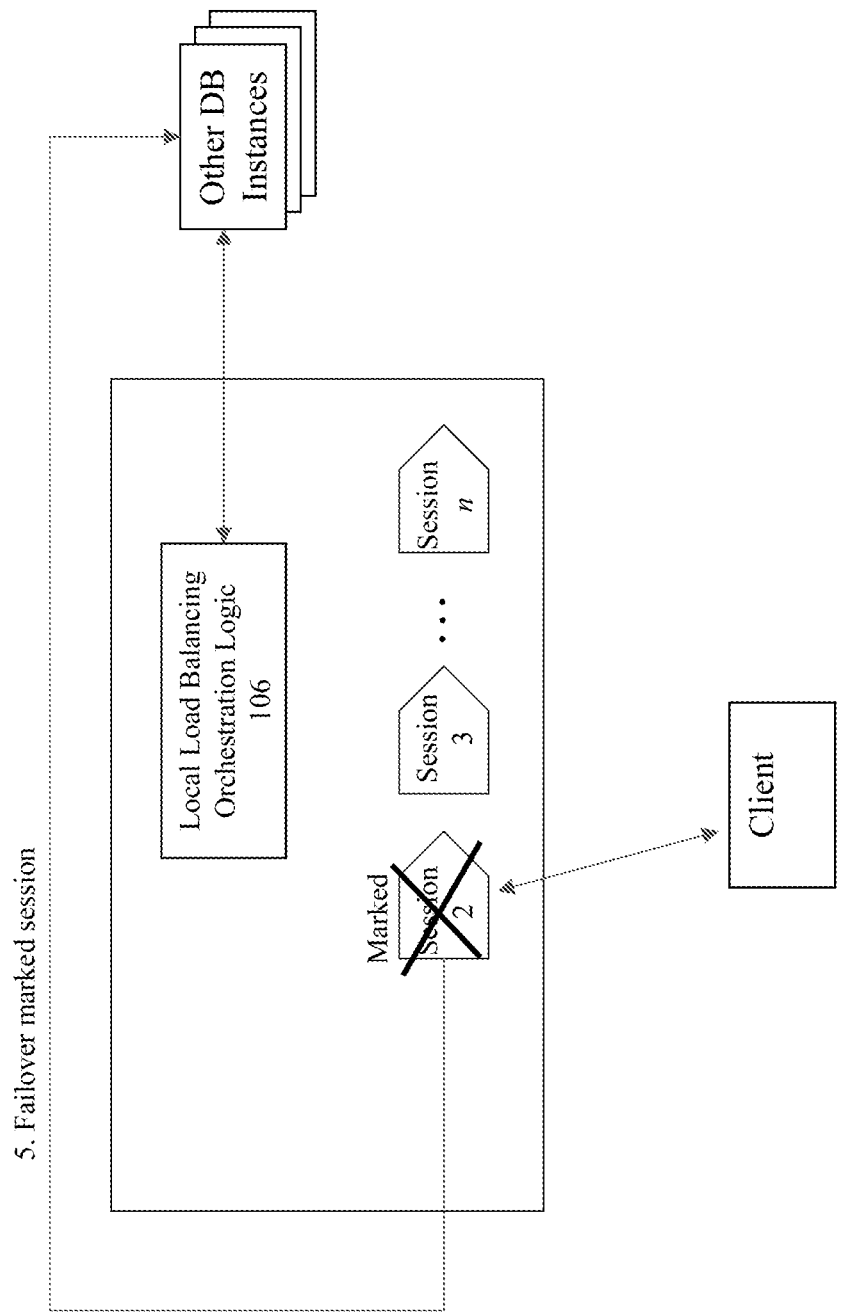

For the marked sessions, each will be given the opportunity to be drained as a graceful and less-expensive way to remove the session's load from the instance. For instance, as shown in FIG. 5D, the drain approach is applied to session 1, where the session will implement a stop service and/or relocate service functionality, e.g., where a "service unavailable" response is provided to any requests for service from a client. In some embodiments, draining automatically includes planned failover for sessions that are unlikely to drain, but are likely to failover. This process is repeated for each service to allow time for the session to drain. New work would be redirected by the listener to a session on an alternative instance. Once the session has been drained, the idle session can then be released.

However, assume that the drain and planned failover processes do not invoke for session 2, where session 2 was also marked for removal. For any number of reasons, the session may be in a state that does not lend itself to stop work by itself, e.g., because the session is in the midst of certain database workload activity and is thus unable to stop handling work/services on behalf of a client. In this situation, after waiting for a designated time period, the system may choose to kill the session. In this approach, session 2 is forcibly shot down at the instance, and its state is transferred to another instance to be brought up to continue its processing.

Figure 5F:
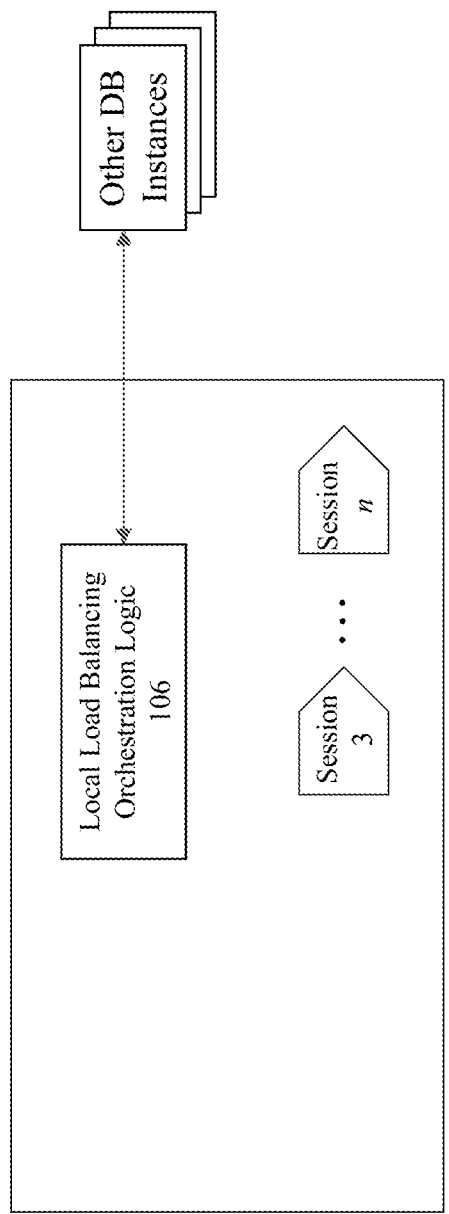

FIG. 5F shows the final state of the instance after the marked sessions have been removed. At this point, the instance has a smaller workload, and hence a smaller proportion of the overall system load, as compared the original state as shown in FIG. 5A.

Therefore, what has been described is an improved approach to perform automatic load balancing for instances in a database cluster. Load imbalances (e.g., based upon the number of connections) are detected globally in the cluster, and can be corrected autonomously by the local instances. The local controller/orchestrator detects the imbalance, computes a target for the instance, and makes any necessary adjustments on the instance.

System Architecture

Figure 6:
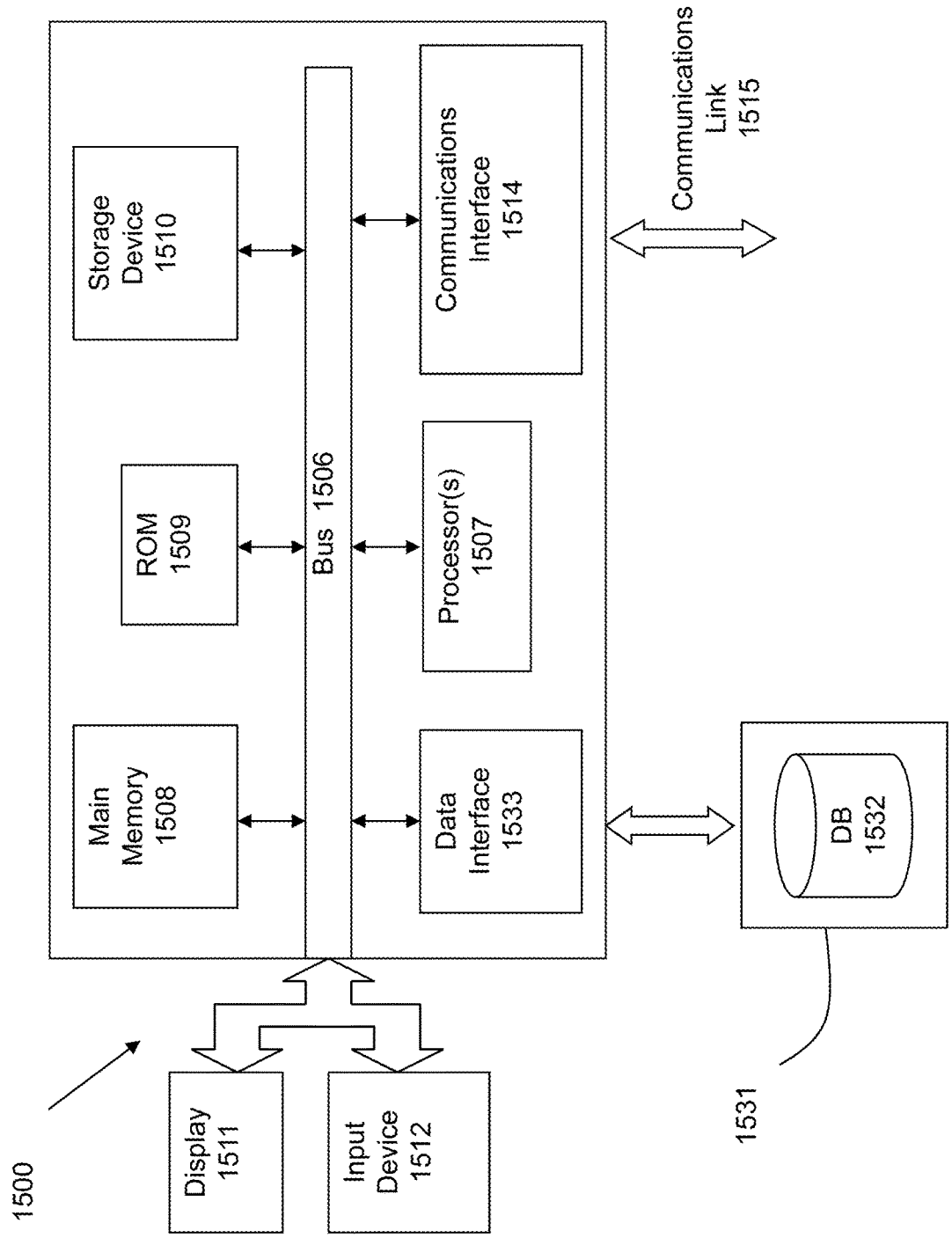
FIG. 6 is a block diagram of an illustrative computing system suitable for implementing an embodiment of the present invention.

FIG. 6 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
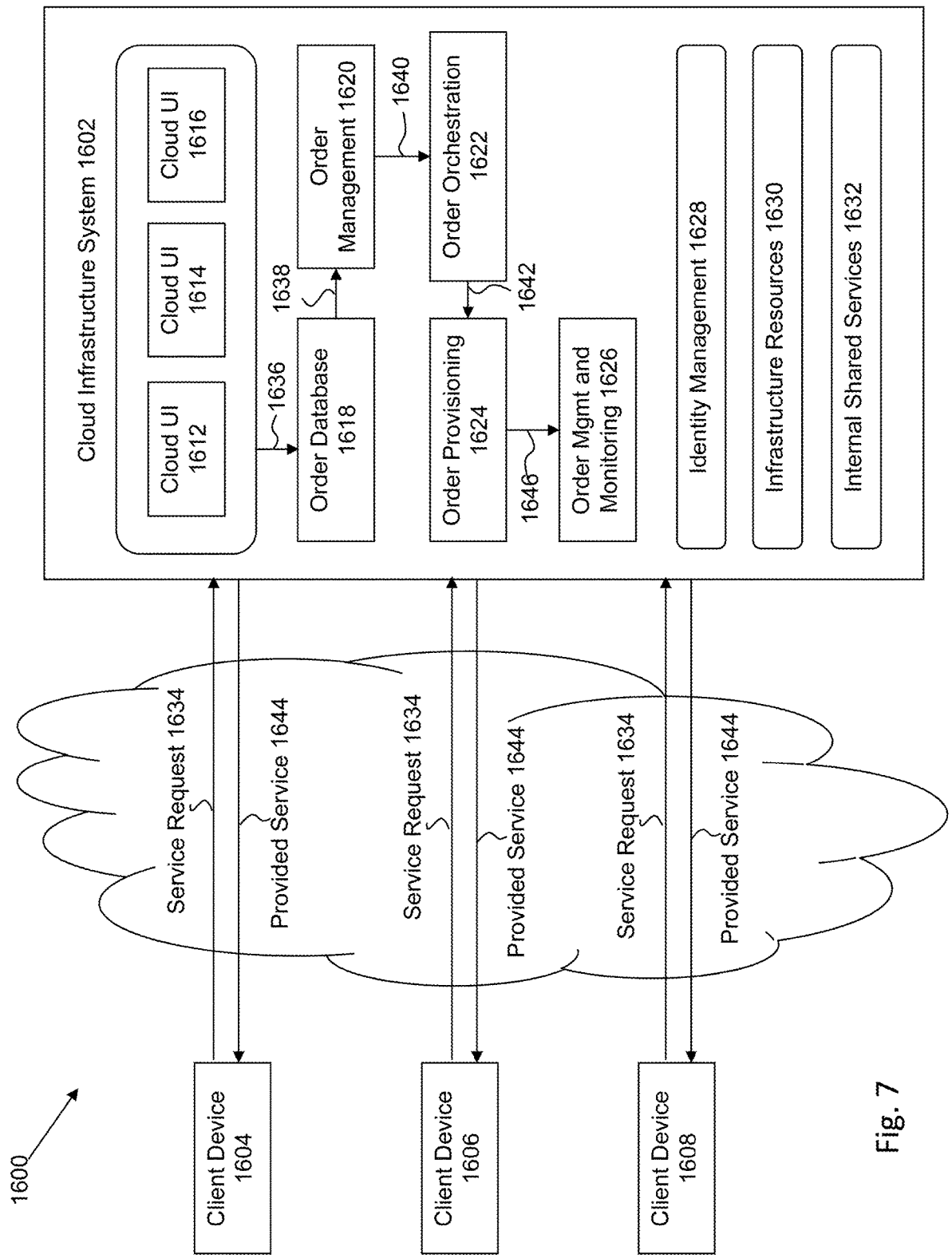
FIG. 7 is a block diagram of one or more components of a system environment in which services may be offered as cloud services, in accordance with an embodiment of the present invention.

FIG. 7 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components. Client computing devices 1604, 1606, and 1608 may be devices similar to those described above for FIG. 6. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
monitoring, using respective load balancing orchestration logics locally located at multiple database instances of a database cluster, workload activity in the database cluster;
accessing global workload data, collected by the respective load balancing orchestration logics and corresponding to a global workload of the database cluster, by a database instance in the database cluster, the database instance having a respective load balancing orchestration logic locally located at the database instance;
in response to globally detecting, by the respective load balancing orchestration logic, a load imbalance in the database cluster, locally determining at the database instance whether the load imbalance exists at the database instance relative to the global workload by using the respective load balancing orchestration logic and the global workload data provided to the database instance; and
identifying, using the respective load balancing orchestration logic located at the database instance, one or more workloads to remove from the database instance to correct the load imbalance.

2. The method of claim 1, wherein the database cluster does not require a single master to provide load balancing instructions to identify workloads to remove from one or more database instances in the database cluster to correct the load imbalance.

3. The method of claim 1, wherein a skew determination is made by the respective load balancing orchestration logic on the database instance to determine whether the load imbalance exists based at least in part upon at least one of central processing unit (CPU) load, service response times, or throughput that exceeds a global statistic.

4. The method of claim 1, wherein metric collection and aggregation is performed to compute a relative ranking based at least in part on a load for the multiple database instances within the database cluster.

5. The method of claim 1, wherein at least one of the one or more workloads to be removed from the database instance corresponds to a database session or database connection to be released.

6. The method of claim 1, wherein the one or more workloads marked to be removed from the database instance are identified based at least in part on the one or more workloads being enabled for high availability (HA).

7. The method of claim 1, wherein a workload of the one or more workloads at the database instance removed from the database instance undergoes a draining procedure, where the workload provides a service unavailable response to any new work requests until the workload has no further current work to perform, at which point the workload can be released.

8. The method of claim 1, wherein a workload of the one or more workloads marked to be removed from the database instance is killed or failed over using one or more planned methods to another database instance.

9. The method of claim 1, further comprising:
  detecting load imbalances globally in the database cluster using the respective load balancing orchestration logics that are respectively, locally located at the multiple database instances of the database cluster; and
  correcting the load imbalances by using a local database instance in the database cluster while accounting for existing load balancing advisories for the database cluster, wherein
    a service layer generates advisory information in addition to the existing load balancing advisories for global detection of the load imbalances in the database cluster, and
    the advisory information and the existing load balancing advisories are sent to a local listener of the local database instance for correction of the load imbalances locally by the local database instance.

10. A system, comprising:
  a processor;
  a memory for holding programmable code; and
  wherein the programmable code includes instructions executable by the processor for
    monitoring, using respective load balancing orchestration logics respectively, locally located at multiple database instances of a database cluster, workload activity in a database cluster;
    accessing global workload data, collected by the multiple load balancing orchestration logics and corresponding to a global workload of the database cluster, by a database instance in the database cluster, the database instance having a respective load balancing orchestration logic locally located at the database instance;
    in response to globally detecting, by the respective load balancing orchestration logic, a load imbalance in the database cluster, locally determining at the database instance whether the load imbalance exists at the database instance relative to the global workload by using the respective load balancing orchestration logic and the global workload data provided to the database instance; and
    identifying, using the respective load balancing orchestration logic located at the database instance, one or more workloads to remove from the database instance to correct the load imbalance.

11. The system of claim 10, wherein the database cluster does not require a single master to provide load balancing instructions to identify workloads to remove from one or more database instances in the database cluster to correct the load imbalance.

12. The system of claim 10, wherein a skew determination is made by the respective load balancing orchestration logic on the database instance to determine whether the load imbalance exists based at least in part upon at least one of central processing unit (CPU) load, service response times, or throughput that exceeds a global average.

13. The system of claim 10, wherein metric collection and aggregation is performed to compute a relative ranking based at least in part on a load for the multiple database instances within the database cluster.

14. The system of claim 10, wherein at least one of the one or more workloads to be removed from the database instance corresponds to a database session or database connection to be released.

15. The system of claim 10, wherein the one or more workloads marked to be removed from the database instance are identified based at least in part on the one or more workloads being enabled for high availability (HA).

16. The system of claim 10, wherein a workload of the one or more workloads at the database instance removed from the database instance undergoes a draining procedure, where the workload provides a service unavailable response to any work requests until the workload has no further work to perform, at which point the workload can be released.

17. The system of claim 10, wherein a workload of the one or more workloads marked to be removed from the database instance is killed or failed over using a planned failed over procedure to move to another database instance.

18. The system of claim 10, the programmable code further including the instructions executable by the processor for:
  detecting load imbalances globally in the database cluster using the respective load balancing orchestration logics that are respectively, locally located at the multiple database instances of the database cluster; and
  correcting the load imbalances by using a local database instance in the database cluster while accounting for existing load balancing advisories for the database cluster, wherein
    a service layer generates advisory information in addition to the existing load balancing advisories for global detection of the load imbalances in the database cluster, and
    the advisory information and the existing load balancing advisories are sent to a local listener of the local database instance for correction of the load imbalances locally by the local database instance.

19. A computer program product embodied on a non-transitory computer readable medium, the non-transitory computer readable medium having stored thereon a sequence of instructions which, when executed by a processor, causes the processor to perform a set of acts, the set of acts comprising:
  monitoring, using respective load balancing orchestration logics locally located at multiple database instances of a database cluster, workload activity in the database cluster;
  accessing global workload data, collected by the multiple load balancing orchestration logics and corresponding to a global workload of the database cluster, by a database instance in the database cluster, the database instance having a respective load balancing orchestration logic locally located at the database instance;
  in response to globally detecting, by the respective load balancing orchestration logic, a load imbalance in the database cluster, locally determining at the database instance whether the load imbalance exists at the database instance relative to the global workload by using the respective load balancing orchestration logic and the global workload data provided to the database instance; and
  identifying, using the respective load balancing orchestration logic located at the database instance, one or more workloads to remove from the database instance to correct the load imbalance.

20. The computer program product of claim 19, wherein the database cluster does not require a single master to provide load balancing instructions to identify workloads to remove from one or more database instances in the database cluster to correct the load imbalance.

21. The computer program product of claim 19, wherein the sequence of instructions further causes a skew determination to determine, by the respective load balancing orchestration logic on the database instance, whether the load imbalance exists, the skew determination based at least in part upon at least one of central processing unit (CPU) load, service response times, or throughput that exceeds a global statistic.

22. The computer program product of claim 19, wherein the sequence of instructions further causes performing metric collection and aggregation to compute a relative ranking based at least in part on load for database instances within the database cluster.

23. The computer program product of claim 19, wherein the sequence of instructions further causes at least one of the one or more workloads to be removed from the database instance corresponding to a database session or database connection to be released.

24. The computer program product of claim 19, wherein the sequence of instructions further causes the one or more workloads marked to be removed from the database instance to be identified based at least in part on the one or more workloads being enabled for high availability (HA).

25. The computer program product of claim 19, wherein the sequence of instructions further causes a workload of the one or more workloads at the database instance removed from the database instance to undergo a draining procedure, where the workload provides a service unavailable response to any work requests until the workload has no further work to perform, at which point the workload can be released.

26. The computer program product of claim 19, wherein the sequence of instructions further causes a workload of the one or more workloads marked to be removed from the database instance to be killed or failed over using a planned failover to failed over to another database instance.

27. The computer program product of claim 19, the set of acts further comprising:
    detecting load imbalances globally in the database cluster using the respective load balancing orchestration logics that are respectively, locally located at the multiple database instances of the database cluster; and
    correcting the load imbalances by using a local database instance in the database cluster while accounting for existing load balancing advisories for the database cluster, wherein
        a service layer generates advisory information in addition to the existing load balancing advisories for global detection of the load imbalance in the database cluster, and
        the advisory information and the existing load balancing advisories are sent to a local listener of the local database instance for correction of the load imbalance locally by the local database instance.

* * * * *